United States Patent [19]

Hommen et al.

[11] Patent Number: 4,682,823
[45] Date of Patent: Jul. 28, 1987

[54] ELECTRICALLY CONTROLLED BRAKE FOR VEHICLES, ESPECIALLY RAIL VEHICLES

[75] Inventors: Winfried Hommen; Georg Stäuble; Tiberius Wieser, all of Munich, Fed. Rep. of Germany

[73] Assignee: Knorr-Bremse AG, Munich, Fed. Rep. of Germany

[21] Appl. No.: 773,267

[22] Filed: Sep. 6, 1985

[30] Foreign Application Priority Data

Sep. 6, 1984 [DE] Fed. Rep. of Germany ....... 3432782

[51] Int. Cl.⁴ ................................................. B60T 8/18
[52] U.S. Cl. ................................. 303/22 R; 303/23 R
[58] Field of Search ................ 303/3, 20, 22 R, 22 A, 303/23 R

[56] References Cited

U.S. PATENT DOCUMENTS

| | | | |
|---|---|---|---|
| 4,223,955 | 9/1980 | Reinecke ............................ | 303/22 R |
| 4,534,599 | 8/1985 | Wright et al. ..................... | 303/22 R |

FOREIGN PATENT DOCUMENTS

| | | | |
|---|---|---|---|
| 0032435 | 7/1981 | European Pat. Off. . | |
| 2546470 | 4/1976 | Fed. Rep. of Germany . | |
| 2710585 | 5/1978 | Fed. Rep. of Germany . | |
| 2801778 | 2/1979 | Fed. Rep. of Germany . | |
| 3240275 | 5/1984 | Fed. Rep. of Germany .... | 303/22 R |
| 3423509 | 1/1986 | Fed. Rep. of Germany . | |
| 496208 | 11/1938 | United Kingdom . | |
| 0704842 | 12/1979 | U.S.S.R. ............................. | 303/22 R |

OTHER PUBLICATIONS

BBC Publication PA20796, 6/19/1952.

*Primary Examiner*—Duane A. Reger
*Assistant Examiner*—Matthew C. Graham
*Attorney, Agent, or Firm*—Pollock, Vande Sande & Priddy

[57] ABSTRACT

The electrically controllable brake, preferably pressure actuated brake for vehicles has a control device (13) which, controlled by a brake demand signal, monitors the release of an appropriate braking power or a corresponding braking pressure. For the vehicle load dependent limitation of the braking force or the braking pressure, a vehicle load signal, present as electrical signal value, is led to a modem (38 to 45), which converts the electrical signal value into a mechanical signal value (prestress of the control spring 36). The mechanical signal value directly controls a limiting device (pressure limiting valve 11) which serves for the vehicle load dependent limitation of the braking power or the braking pressure to be delivered. During a failure of the electrical vehicle load signal, of the electric components and/or of the power supply, the modem maintains approximately constant the momentary mechanical signal value, so that the braking power or braking pressure to be delivered remains limited in dependence on the vehicle load, even during a failure of the vehicle load signal. This prevents overbraking of the vehicle during the stated and other emergencies.

3 Claims, 2 Drawing Figures

ELECTRICALLY CONTROLLED BRAKE FOR VEHICLES, ESPECIALLY RAIL VEHICLES

FIELD OF THE INVENTION

The invention concerns an electrically controllable brake for vehicles, particularly rail vehicles, with a control device, controlled by an electrical braking demand signal for producing a braking force corresponding to the braking demand signal, wherein the control device may have an emergency braking system - effective in emergencies, especially during power failures - for the introduction of maximum braking power, and with a limiting device, controlled by a vehicle load signal corresponding to the vehicle load, for the vehicle load dependent limitation of the braking power.

BACKGROUND OF THE INVENTION

From German Patent Application No. B 422 II/20f, and from German Pats. Nos. 25 46 470 and 27 10 585, electro mechanical brakes are known, especially for rail vehicles, in which the brake request signal is led to an electrical actuator, which controls—eventually through a drive—the tension or the release of a spring loaded mechanism, the force of which produces the braking power to be led to the mechanical friction brakes. For this type of brake, German Pat. No. P 34 23 509 (published after the priority date of the present application) proposes for emergencies the provision of an emergency braking system, which uncouples the electrical actuator from the spring loaded mechanism in case of power failure, so that the spring loaded mechanism can deliver its full power as braking power. As this can easily lead, especially with an empty vehicle, to overbraking with blocking vehicle wheels, the patent application proposes a further mechanical limiting device for the deliverable braking power, which, by means of a mechanical vehicle load signal, controlled through a Bowden cable, limits the release of the spring load mechanism and thus the braking power. The setting, transmition and evaluation of the mechanical vehicle load signal is expensive, complicated and mostly relatively imprecise, and it has to be considered that in most brakes of this type the electrical brake demand signal already contains an electrical signal value for the vehicle load. However, it has to be taken into account that in emergencies, especially during power failure, the brake demand signal with its vehicle load dependent electrical signal value may completely fail, which may have the effect that, without the above-mentioned mechanical limiting device, braking at the maximum braking power that the spring loaded device can deliver may result, and thence overbraking as mentioned above.

According to the characteristics of the preamble of patent claim 1, the invention is based on brakes of the type described above.

Furthermore, electrically controllable pressure actuated brakes are known, which can particularly also constitute hydraulic brakes, wherein the control device in dependence on the brake demand signal produces a braking pressure which acts on a braking cylinder, and wherein the limiting device is a pressure limiting valve which limits the braking pressure to be led to the braking cylinder by the control device or the emergency braking device in dependence on the vehicle load. This type of pressure activated brake is known, e.g., from U.S. Pat. Nos. 3,730,597 and 3,920,285 and German Published Patent Application No. 28 01 778.9. Especially U.S. Pat. No. 3,920,285 shows clearly that a mechanical vehicle load signal, given off by the vehicle suspension, such as the pressure in the cushion-type pneumatic springs of the vehicle, is, on the one hand, converted into an electrical signal value which, together with the braking demand signal, is led to the control device for establishing a braking pressure, and that, on the other hand, an additional pressure limiting valve must be provided which is directly controlled by the mechanical vehicle load signal and, especially in cases of emergency upon loss of the mentioned electrical signal value or upon loss of all the electronics, effects a vehicle load dependent limit on the braking pressure for the prevention of overbraking. It is understood that arrangements such as in German Published Patent Application No. 28 40 262 can be equipped with this type of pressure control valves for the vehicle load dependent limitation of the brake pressure in case of failure of the electronic system. In the case of all these pressure actuated brakes, it is necessary to supply a mechanical vehicle load signal to the pressure limiting valve, the creation and supply of this often imprecise mechanical vehicle load signal being, as already mentioned, difficult and expensive, particularly as the pressure actuated brakes are already processing an additional electrical vehicle load dependent signal value.

From German Pat. No. 496 208 and U.S. Pat. No. Re 28,538 (re-issue of U.S. Pat. No. 3,547,499) it is already known to establish solely an electrical vehicle load signal for other types of pressure actuated brakes, and to evaluate it in the pressure actuated braking system for the creation of braking power. However, during power failure and the consequent emergency braking taking place for safety reasons, the electrical vehicle load signal gets lost, which might cause the already mentioned overbraking.

SUMMARY OF THE INVENTION

It is the object of the invention to construct electrically controllable brakes, and in particular pressure actuated brakes, in a simple manner, such that purely electrical signal values can be established as vehicle load signals and led to the brake or pressure actuated brake, and that, thus, the supply of mechanical vehicle load signals can be dispensed with, with the assurance that during failure of the electronics and/or electronic components, or during emergency braking with loss or non-processability of the electric vehicle load signal, a vehicle load dependent limitation of the braking power or braking pressure is nevertheless guaranteed and overbraking avoided.

This problem is solved in simple and reliable manner in that the electrical signal value of the vehicle load signal, known per se, is led to a modem, containing electronic parts, which converts the electrical signal value into a mechanical signal value which also directly controls the limiting device if needed, and that the modem in the event of failure of its electronic parts and/or of the electronic signal value, maintains at an at least substantially, constant value the mechanical signal value registered at the time of the failure. When the brake is a pressure actuated, it is suitable that the mechanical signal value determines the prestress of a control spring controlling the pressure limitor serving as limiting device.

BRIEF DESCRIPTION OF THE DRAWINGS

In order that the invention may be more clearly understood, reference will now be made to the accompanying drawings, wherein an embodiment of the invention is shown for purposes of illustration, and wherein.

DETAILED DESCRIPTION

Figures 1, 2:
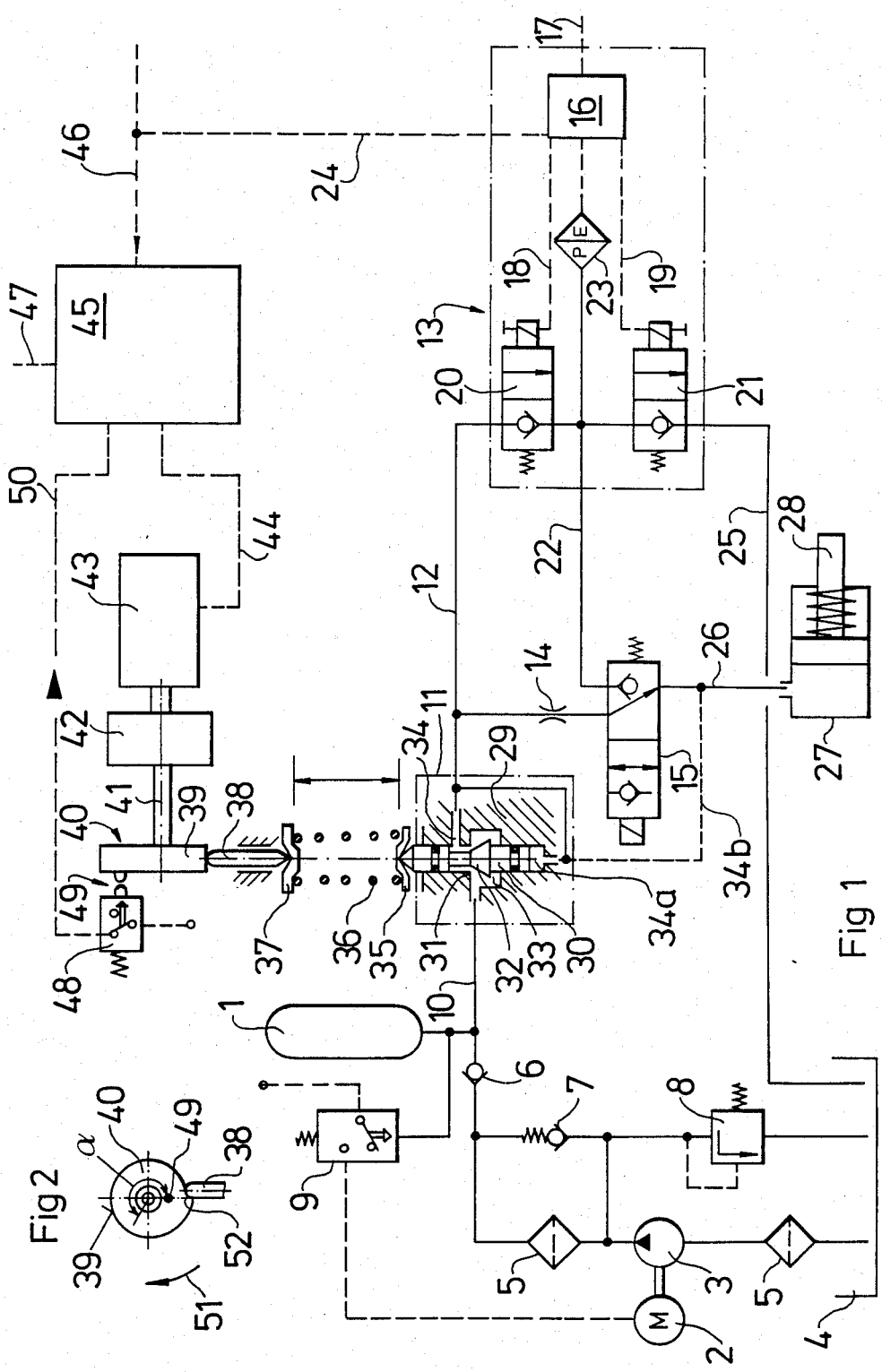
FIG. 1 shows schematically an hydraulic pressure actuated brake according to the invention and FIG. 2 shows a detail of FIG. 1.

According to FIG. 1, a motor 2 drives a pump 3 for the charging of an hydraulic accumulator 1, which pump conveys an hydraulic medium into the accumulator 1 from an hydraulic reservoir 4 via pre- and post-mounted filters 5 and a check valve 6. For safety reasons, the filter 5, mounted behind the pump 3, is bridged by a check valve 7; a pressure relief valve 8 connects the pressure side of the pump 3 with the hydraulic reservoir 4. A pressure control device 9 for switching the motor 2 on or off is connected to the accumulator 1 which serves as source of the pressure medium. The accumulator 1 is connected through a line 10 to the intake of a pressure limiting value 11 from the outlet of which a line 12 leads to a control device 13 and, via a nozzle 14, to an emergency brake valve 15.

The control device 13 contains electronics 16, to which an electrical brake demand signal is led via cable 17, and which controls, through electrical connections 18 and 19, a solenoid intake valve 20 and a solenoid outlet valve 21 to create a braking presssure which is to be led off through a line 22. For returning the actual braking pressure value, a pressure converter 23 is provided inside the control device 13, which is connected, on the one hand, to the line 22 and, on the other hand, to the electronics 16. In addition, it is possible to provide for a cable 24 through wich an electrical vehicle load signal can be led to the electronics 16; however, cable 16 with the lead-in of the electrical vehicle load signal can be omitted if a vehicle load dependent charge on the control device 13 is dispensed with. The solenoid intake valve 20 is arranged between the lines 12 and 22 and the solenoid outlet valve 21 is arranged between the line 22 and a line 25 which leads back to the hydraulic reservoir 4. The control device 13 thus is constructed similarly to the device known from the mentioned German Publishe Patent Application No. 28 40 262.2, which is, however, designed for pneumatic brakes, and also operates in a similar manner: the brake demand signal registered in cable 17 causes the electronic 16 to charge the solenoid input valve 20 and the solenoid outlet valve 21 in such a manner that a braking pressure, corresponding to the electrical brake demand signal, is registered in line 22, the actual value of this braking pressure being reported back to the electronics 16 through the pressure converter 23. When the cable 24 is present, the braking pressure in line 22 can additionally be controlled in a vehicle load dependent manner; however, this control is not absolutely necessary, and can also be effected by the pressure limiting value 11. The -electronics 16 can be constructed according the already mentioned German Published Patent Application No. 28 40 262.2 or according to U.S. Pat. Nos. 3,920,285 or Re 28 538.

From the emergency brake valve 15, a line 16 leads to a brake cylinder 27, from the piston rod 28 of which the braking power to be led to the friction brakes (not shown) can be drawn. In the illustrated unexcited state, the emergency brake valve 15 blocks line 22, connected to it, from line 26 and connects lines 12 and 26 via the nozzle 14; however, in the excited state, it separates the connections between lines 12 and 26, and connects lines 22 and 26. In the energizing circuit (not shown) for the emergency brake valve 15, the usual safety switches can be inserted, which interrupt the circuit upon unavailability of the driver, deliberate actuation by a passenger, disturbances in the electric system of the vehicle, especially the control device 13 in the electronics 16, passage through a "stop" signal, a pressure drop in the accumulator 1 and/or during other emergency situations.

The pressure control valve 11 has a valve slide 30, axially displaceably guided in a housing 29, which forms, by means of a sealing surface 32 which can be placed on a housing rim 31, a shut-off valve 31, 32 and, depending on its axial position, opens or interrupts the connection of two spaces 33 or 34, which connect with line 10 or 12. The one front face of the valve slide 30 is charged, through a space 34a, with the pressure existing in space 34, this charge acting in the application direction of the sealing surface 32 onto the housing rim 31 and thus the separation between the spaces 33 and 34. Space 34a can, as a variation, also be separated from space 34 and be connected to line 26 through a line 34b, shown in a dotted line. The other end of the valve slide 30, via a toe bearing, carries a spring plate 35 on which a control spring 36 is seated. The end of the control spring 26 facing away from the valve slide 30 abuts a spring plate 37 which is supported, via a tow bearing, against an axially displaceable supported push-rod 38, co-axial with the control spring 36. The end of the push rod 38 which faces away from the control spring 36 rests against the circumferential surface of a rotating cam 40 which is constructed as cam surface 39. The rotating cam 40 is non-rotatably connected to a shaft 41 which is drivable by an electric servomotor 43 through a gear 42. The electrical actuation of the servomotor 43 is controlled through a cable 44 by electronics 45, to which, via a cable 46, the already mentioned electric vehicle load signal and, via another cable 47, a signal indicating the start of the travel, such as the closing of the vehicle doors, are transmitted. If present, cable 24 is suitably connected to cable 46. Near the rotating cam 40 there is an electric switch 48, which supplies an electric signal to the electronics 45 via a cam arrangement 49 in a certain rotational position of the rotating cam 40 through a cable 50. The rotating cam 40 is shown in FIG. 2. It can be seen that the cam surface 39 is a surface which rises in the rotational direction of the cam shown by arrow 51 and is somewhat helical, and returns in a relatively steep step 52. The switch 48 with the cam arrangement 49 is arranged in such a manner that immediately after the sliding off of the push rod 38 along the step 52, into the position shown in FIG. 2, the "zero position", the switch 48 leads the electrical impulse to the electronics 50. Parts 38 to 45 form a modem 38 to 45, which contains electrical parts 45, 43 and controls the tension of the control spring 36 by means of regulating cams 38, 40, formed by the turning cam 40 and the push rod 38:

Starting from only desired rotational position of the rotating cam 40 and the standing vehicle, as well as existing electrical vehicle load signal in the cable 46 and possibly cable 24, the electronics 45 receive, at the start of the travel, e.g., upon closing of the vehicle doors, a signal through cable 47, which signal causes the electronics 45 to start up the servomotor 43 through cable 44. The servomotor 43 runs the shaft 41 and thus the turning cam 40, by means of the reduction through gear 42, whereby the push-rod 38 slides along the cam surface 39. As soon as the push-rod 38 slides off the step 52, i.e., has reached the position shown in FIG. 2 ("zero position") of the rotating cam 40, the switch 48 shuts off for a short time and sends, through the cable 50, a signal to the electronics 45, indicating the position at that moment. Starting from this rotational position, the electronics 45 excites the servomotor 43 through the cable 44 to an extent corresponding to the electrical vehicle load signals as registered in cable 46, in such a manner that the servomotor 43, through the gears 42, continues turning the rotating cam 40 through a certain angle, corresponding to the vehicle load signal, and then stops it. The push-rod 38 thereby attains a very specific position along the cam surface 39 and is placed in a corresponding axial position, which causes the control spring 36, through the spring plate 37, to obtain a very specific prestress, dependent on the electrical verhicle load signal present in the cable 46.

The rise in the cam surface 39 is so small that after the shutting off of the servomotor 43, the push-rod 38, pressed against the cam surface 39 by the control spring 36, cannot effect rotation of the rotating cam 40; rather the attained rotational position of the rotating cam 40 remains constant after shutting off of the servomotor 43. As a result of the charge on one side by the prestress of the control spring 36 and the charge on the other side from the pressure caused by the pressure medium in space 34 and thus in line 12, the pressure limiting valve 11 controls, from line 10 into line 12, a certain pressure level, in dependence on the prestress of the control spring 36 and thus the registered vehicle load signal in cable 46: when it falls below this pressure level, the control spring 36 keeps the sealing surface 32 away from the housing rim 31, when a certain control pressure level is reached, the valve slide 30 is shifted by means of a pressure charge through the space 31 against the force of the spring 36, until seating of the sealing surface 32 on the housing rim 31, causing the supply of pressure medium into the line 12 to be shut off; should there be too high a pressure in line 12 due to vehicle unloading, such pressure is immediately reduced to the correct pressure value during a subsequent braking. As a variation to this, the pressure control valve 22 can be provided, in a manner not shown, with a release valve part for the reduction of high pressures in line 12. Thus, a certain pressure level, dependent on the vehicle load signal, is fed into line 12. This pressure level is maintained, because of the stated self-limitation of the regulating cams 38, 40, even during a failure of the vehicle load signal in cable 46, and/or of the electrical components 43, 45, e.g., during a power failure.

In the excited condition of the emergency brake valve 15, it connects the braking cylinder 27 through lines 26 and 22 and the solenoid outlet valve 21, open during brake release, with the hydraulic reservoir 4, so that the brake cylinder 27 is without pressure and does not supply any braking force. If a braking action is initiated by a corresponding brake demand signal in cable 17, the electronics 16 excite the solenoid input valve 20 and the solenoid outlet valve 21 in such a manner that the latter closes and the former conducts a braking pressure from line 12 into line 22 and thus into the braking cylinder 27. As soon as this brake pressure attains a certain level, corresponding to the registered brake demand signal (which is reported back by the pressure modem 23 to the electronics 16) the latter also closes the solenoid input valve 20, so that the attained braking pressure is maintained at a constant level. As already mentioned, the electronics 16 can modify the braking pressure to be led into the line 22, in dependence on the vehicle load signal fed in by cable 24, which is of particular advantage during partial braking. During a full braking action, the braking pressure to be led into line 22 will already be limited by the presssure control valve 11, which only feeds into line 12 a pressure limited according to the vehicle load of the time. For the subsequent brake release, the electroncis 16 is induced by means of the brake demand signal to open the solenoid outlet valve 21, while the soleniod input valve 20 is kept closed, so that the braking pressure in the braking cylinder 27 is exhausted into the hydraulic reservoir 4.

If the excitation of the emergency brake valve 15 fails with released or actuated vehicle brakes, which could occur particularly by the opening of one of the already mentioned switches, built into its excitation circuit, the full, load dependently limited pressure is fed from line 12 with branching of line 22 into line 26 and the braking cylinder 27, whereby nozzle 14 limits the pressure increase speed to avoid particularly hard braking jolts to the vehicle. The pressure limiting valve 11 here also assures that the braking cylinder 27 can only be charged with a pressure limited to the respective vehicle load, so that overbraking of the vehicle is made impossible. During a re-excitation of the emergency brake valve 15, the latter switches back, whereby the braking cylinder 27 is exhausted, fully or partially, depending on the brake demand signal in cable 17.

As a variant of the embodiment described above, it is also possible to omit the emergency brake valve 15 with the nozzle 14 and to connect line 22 permanently with line 26. The electronics 16 should then be constructed in such a manner that, during power failure or other interference or during the starting of an emergency braking procedure, the solenoid input valve 20 is kept permanently open and the solenoid valve 21 permanantly closed.

Switch 48 may also be arranged in such a manner that it can be actuated directly by the lift position of push-rod 38, and not by the rotational position of the rotating cam 40.

The cam control by means of rotating cam 40, cam surface 39 and push-rod 38 for prestressing the control spring 36 can be constructed in any desired manner, deviating from the embodiment described above; it is particularly also possible to construct this cam control in a non-self-limiting manner. In this case it is suitable to provide the servomotor 43 with a conventional motor brake in such a manner that the resting servomotor 43 is continuously braked, and the brake is only released for a short time when the servomotor 43 is excited by a signal in cable 44. Furthermore, it is also possible to construct the gears 42 in a self-limiting manner, e.g., as worm gears, in such a manner that the shaft 41 can be driven by the servomotor 43, but the shaft 41 cannot drive the servomotor 43. It is further possible to provide, instead of the rotating cam 40 with gears 42 and servomotor 43, a lifting motor for the push-rod 38, directly or indirectly engaged through suitable transmission rods, by means of an electromagnet, in which case a lifting brake that is activated in the unexcited state must be provided for the push-rod 38.

In the case of all the above-mentioned embodiments, which are certainly also usable for pneumatic brakes, it is important that, in case of failure of the electrical vehicle load signal in cable 46, of the electrical components 43, 45 and/or of the power supply, the push-rod 38 is retained in its momentary lift position by a brake or self-limit device, whereby the prestress of the control spring 36 is kept constant; thus, the prestress of the control spring 36 forms a mechanical signal value, formed by the electrical vehicle load signal, which directly controls the pressure limiting valve 11 and which is maintained even during the mentioned failures. Thus it is only necessary to install in the vehicle an easily mounted and accommodated device, especially a pressure pickup device, for the registration of an electrical vehicle load signal, which electrical vehicle load signal can be led to the brake or pressure actuated brake by means of an also simple cable connection, and used there for vehicle load dependent brake pressure limitation as well as for the vehicle load dependent control of the control device 13.

With an electrically controllable brake according to the above-mentioned German Pat. No. P 34 23 509.4, it is possible to provide, in place of the mechanically controllable, vehicle load dependent braking force limiting device there shown, a cam control according to the above described embodiments, controllable by an electrical vehicle load signal for limiting the braking power which can be given off by the loaded spring, or by the brake lift which can be executed by the loaded spring. Here too, during failure of the electrical vehicle load signal, the function of the vehicle load dependent braking power limit is maintained by keeping constant the respective cam setting, so that even during a failure of the vehicle load signal, the electric and/or power supply, overbraking is avoided.

In all the embodiments described above, upon stopping of the vehicle and opening of the vehicle door, the electronics 45, by a corresponding command through cable 47, effects an interruption in the vehicle load dependent rotational position of the rotating cam 40 in dependence on the vehicle load signal in cable 47. Upon opening of the vehicle doors or during any other stopping of the vehicle as shown in the electronics 45, the rotating cam 40 and thus the push-rod 38 remain in their momentary position. During a subsequent closing of the vehicle doors or any other starting of the vehicle indicated by a corresponding signal via cable 47 to the electronics 45, as described above, resetting of the rotational position of the rotating cam 40 takes place in dependence on the now existing vehicle load signal in cable 46 as described above. It is certainly possible to change this control action of the electronics 45, e.g., it is possible, if the signal to be sent through cable 47 is omitted, to have the electronics 45 provide for a permanent vehicle load dependent rotational adjustment of the rotating cam 40, even when the vehicle is standing still, whereby it is also possible to omit switch 48 with cable 50. It is possible to construct the servometer 43, possibly constituted by a step motor, to operate forward and backward, and to store its respective position, step dependent, in the electronics 45 or report back to the electronics 45 through a real value report, so that the latter can continuously arrange, without adjustment, to an "0 position" determined by the cam arrangement 49, corresponding to the respective vehicle load signal, wherein, in case of failure of the vehicle load signal, of the electrical components and/or of the power supply, the momentary position can be maintained in the described manner through self-limitation or a brake. Otherwise it is also possible to construct the electronics 45 in such a manner that, during the start-up of the vehicle, it only makes a short-term readjustment of the position of the turning cam 40 and is shut down during the remainder of the ride for the protection of the mechanical parts, the attained setting also being automatically retained. The working period of the electronics 45 can be limited, e.g., by a timer segment.

We claim:

1. Electrically controllable brake for vehicles, particularly rail vehicles, with a control device (13) controlled by an electrical braking demand signal for producing a braking force corresponding to the braking demand signal, wherein the control device comprises an emergency braking system, (15) for the introduction of maximum braking power, and with a pressure limiting valve (11) controlled by a vehicle load signal corresponding to the vehicle load for vehicle load dependent limitation of braking power, wherein the vehicle load signal representing an electrical signal value through control electronics (45) controls a servomotor (43), which in turn controls the axial position of a spring support (37) for a control spring (36) controlling said pressure limiting value (11) through a gear (42) and an adjustable cam (38, 40) downstream of said gear, and wherein said adjustable cam (38,40) controls a signal device (switch 48) which, in a predetermined cam position transmits an adjustment signal to said control electronics (45).

2. Brake according to claim 1, wherein said control electronics (45) receives a starting signal at the beginning of travel, possibly in dependence on door closing, means dependent on said starting signal for adjusting said cam (38, 40) by means of said servomotor (43) until a predetermined adjustable cam position is reached, and for then adjusting said adjustable cam (38, 40) in dependence on the available vehicle load signal to a position corresponding to the latter.

3. Brake according to claim 2, wherein said control electronics (45), upon attainment of a position of said adjustable cam (38, 40) corresponding to said vehicle load signal, shuts off at least said servomotor (43), and possibly also itself, until the next starting signal is received.

* * * * *